Dec. 4, 1956    H. B. VAN RENSSELAER    2,772,465
APPARATUS FOR FORMING A HOLLOW BODY OF CONCRETE OR THE LIKE
Filed Nov. 12, 1953
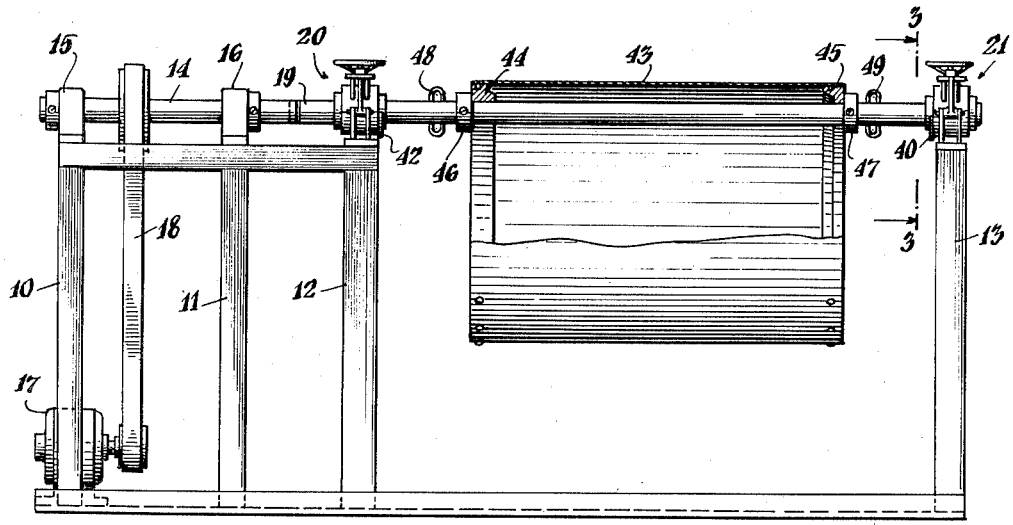
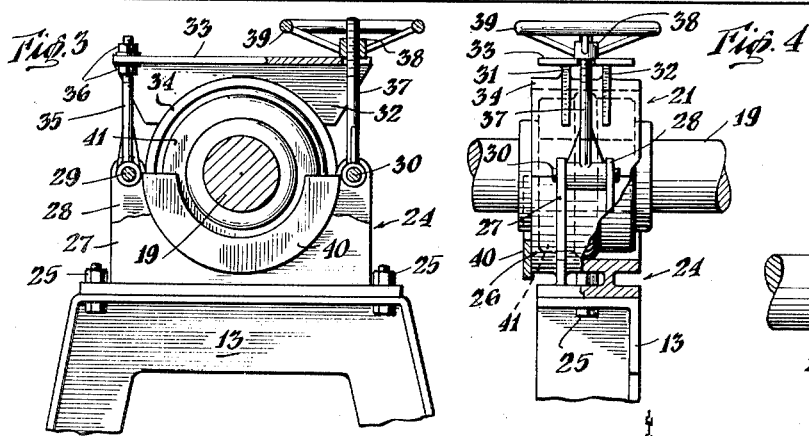
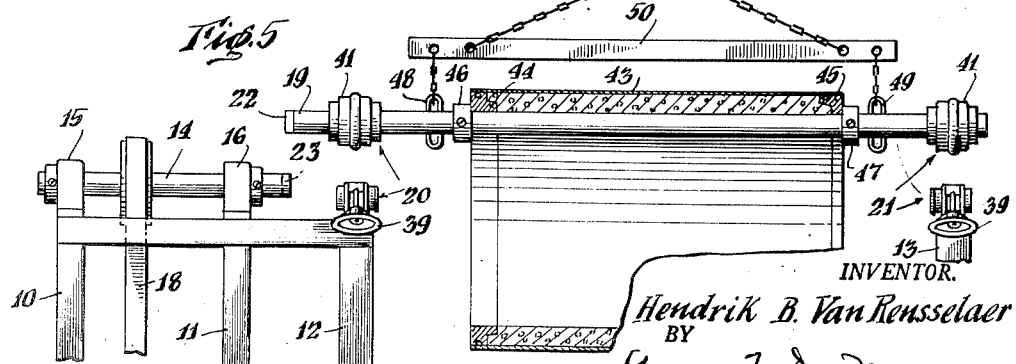
INVENTOR.
Hendrik B. Van Rensselaer
BY
George F. DesMarais
ATTORNEY

2,772,465

APPARATUS FOR FORMING A HOLLOW BODY
OF CONCRETE OR THE LIKE

Hendrik B. Van Rensselaer, Summit, N. J., assignor to Lock Joint Pipe Company, East Orange, N. J., a corporation of New Jersey Application November 12, 1953, Serial No. 391,414

5 Claims. (Cl. 25—30)

This invention relates to an apparatus for forming a hollow body of concrete or the like, and more particularly to an apparatus wherein a hollow mould is suspended from and rotated by a roller or shaft which extends through the mould and compacts the concrete within the mould as the roller and mould rotate. This type of moulding apparatus is useful in making concrete pipe. In such an apparatus the mould includes a cylindrical shell and a pair of annular members or mould end rings which are attached to the shell and extend radially inwardly therefrom. The mould is suspended from the roller by engagement of the annular members therewith. Customarily a relatively dry concrete mix is employed. The concrete mix is supplied to the interior of the mould and as the mould rotates it is carried rotationally with the mould and rolled by the roller to an inside diameter slightly less than the inside diameter of the mould end rings. The rolling action of the roller on the concrete distributes the concrete to a uniform wall thickness within the mould, and firmly compacts the concrete to form a thoroughly dense wall.

The present invention has as an object to facilitate the removal of the mould and a finished product from the apparatus, and the rapid conditioning of the apparatus for the forming of another product in the interest of high production and the full utilization of the capacity of a given apparatus. To this end the apparatus is so constructed that the roller or suspension shaft, together with the mould and finished product, may be quickly removed from the apparatus and another mould substituted with the least loss of manufacturing time. The roller or suspension shaft is a unit which may be a single shaft section or an assembly of several shaft sections.

The roller is driven by a shaft, and readily disconnectable means are provided for coupling the roller to the drive shaft. The roller is journalled and supported in bearings adjacent each end, including outer housings or pillow blocks which may be quickly opened and closed.

For a more comprehensive understanding of the invention, reference may be had to the accompanying drawing, in which:

Fig. 1 is a front elevation of an apparatus embodying the invention;

Fig. 2 is a detail of a coupling between a drive shaft and a roller or suspension shaft;

Fig. 3 is an enlarged detail of the bearing at the right end of Fig. 1 on line 3—3;

Fig. 4 is an enlarged elevational view of the bearing of Fig. 3; and

Fig. 5 illustrates the roller and mould lifted from the remainder of the apparatus.

The apparatus may include any suitable type of base or frame for supporting the operating members and shafts. The base shown in Fig. 1 consists of a plurality of vertical frame elements or supports 10, 11, 12 and 13 spaced apart and rigidly secured by stretchers. The bearings for the shafts are mounted on the frame.

A drive shaft 14 is mounted in bearings 15 and 16 and is driven by a motor 17 through a suitable belt and pulley connection 18.

The roller or suspension shaft 19 is mounted adjacent each end in bearings 20 and 21 which are preferably of a flexible or self-aligning type. One of these bearings, the bearing 20 for example, may be of a conventional type having both radial and thrust carrying capacities, and include an inner element and race seized upon the roller shaft 19 and an outer element and race which is engaged by the outer housing or pillow block of the bearing.

The position of the roller shaft when in its bearings is such as to locate the adjoining ends of the roller shaft and drive shaft close enough to enable their coupling, as by a clamp or otherwise. As best seen in Fig. 2, one of the shafts has a tongue 22 engaged in a groove 23 in the other shaft. A simple tongue and groove connection enables the disengagement of the coupling with the least manipulation.

The bearing 21 at the other end of the roller may consist of a conventional self-aligning bearing of the expansion type. The bearing elements surrounding the roller are supported on the lower portion 24, Figs. 3 and 4, of a split outer housing or pillow block. The lower portion 24 is secured to the frame element 13 by bolts 25. The lower portion of the outer housing includes a semi-circular bearing-retaining plate 26 and a pair of radially disposed plates 27, 28, in which the pivot pins 29 and 30 are mounted.

The upper portion of the outer housing includes two radially disposed plates 31 and 32 which are connected together by a horizontal plate 33 and by a semi-circular bearing-retaining plate 34. The upper portion of the housing is so constructed that it may be easily removed from the lower portion. This is accomplished by pivotally connecting the upper portion of the housing to the lower portion of the housing by a pair of rods 35 fastened to the plate 33 by the nuts 36, and the engagement of eyes at the lower ends of these rods with the pivot pin 29. The displaceable portion of the outer housing is held closed by a threaded member 37 pivotally mounted on the pin 30 and a nut 38 which is rotated by handwheel 39 for clamping the nut against the plate 33.

As shown in Fig. 4, a radially disposed plate 40, fastened to the semi-circular plate 26, overlaps one end of the outer element 41 of the bearing whereby to limit the axial movement of the bearing in one direction. The outer housings or pillow blocks for the two bearings 20 and 21 are similarly constructed except that the plates 40 and 42 are located on opposite sides of the respective housings so as to center the roller 19. It will be understood that both of the plates 40 and 42 may be dispensed with when either bearing 20 or 21 is a thrust-restraining bearing.

As shown in Fig. 1, the mould comprises a cylindrical shell 43 for forming the exterior surface of a moulded hollow body, and annular members or mould end rings 44, 45, to which the shell is secured. The shell may be a plate rolled to the outside diameter of the mould end rings and held in contact therewith by angle irons fastened to the abutting longitudinal edges of the plate and secured to each other by bolts. A series of rivets circumferentially spaced about the rolled plate at each end extend radially inwardly and in engagement with annular grooves in the end rings. The moulding surfaces of the end rings are shaped to form the ends of the moulded body. In the present instance they provide bell and spigot ends for a concrete pipe.

The inner diameters of the annular members or mould rings 44 and 45 engage the roller or suspension shaft 19. The mould is located along the roller by a pair of collars 46, 47, which are fast to the roller. The roller is provided with eyes 48 and 49 which are disposed in the radial plane of the tongue and groove coupling 22, 23. After rotation has ceased, the outer housings of the bearings 20 and 21 are opened and the chains of a lifting device 50 are attached to the eyes 48, 49. With the tongue and groove connection vertically disposed, the roller and the mould are lifted from the opened bearing housings. A duplicate roller and another mould can be immediately placed in the apparatus, and the forming of another pipe commenced while the first mould is being carried away. This minimizes loss of machine-operating time.

The operation of the machine will be apparent to those skilled in the art in view of the foregoing disclosure. The principle of the invention, together with apparatus which is now considered to represent the best embodiments thereof, have been described in accordance with the provisions of the patent statutes, but it is desired it be understood that the apparatus disclosed is only illustrative and that the invention can be carried out by other means. Also, while the apparatus is designed to use the various features and elements in the combinations and relations described, some of these may be altered and others omitted without interfering with the invention and the general results outlined.

What is claimed is:

1. Apparatus for forming a hollow body of concrete or the like, comprising a hollow rotary mould having spaced-apart annular members extending radially inwardly of the outer moulding surface of said mould, means rotatably supporting said mould, said supporting means comprising a plurality of separate shafts of which one of the shafts constitutes a roller for suspending said mould, said roller shaft threaded through said mould and extending beyond the ends of said mould, bearing means rotatably supporting said shafts in alignment on a common axis, and radially engageable and disengageable coupling means for engaging said shafts for concomitant rotation thereof, said coupling means constructed and arranged for permitting disengagement of said roller shaft and the moving of said roller shaft radially outwardly from said common axis so as to enable said mould to be carried on the roller shaft laterally away from said bearing means.

2. The combintion set forth in claim 1 in which said disengageable coupling means comprise a tongue radially disposed on the end of one shaft and engaging within a groove in another shaft.

3. Apparatus for forming a hollow body of concrete or the like, comprising a hollow rotary mould having spaced-apart annular members extending radially inwardly of the outer moulding surface of said mould, a roller shaft threaded through said mould and suspending said mould, a drive shaft aligned end to end with said roller shaft, bearing means for said drive shaft, bearing means disposed adjacent each end of said roller shaft for rotatably supporting said roller shaft independently of said first-named bearing means, and disconnectable means for coupling the adjoining ends of said shafts, said disconnectable means being disposed between the bearing means of said respective shafts so that said roller shaft and mould may be lifted away from connection with said drive shaft when said disconnectable means is uncoupled.

4. The combination set forth in claim 3 wherein said roller shaft is provided with means enabling lifting of said roller shaft from end to end alignment with said drive shaft.

5. Apparatus for forming a hollow body of concrete or the like, comprising a hollow rotary mould having spaced-apart annular members extending radially inwardly of the outer moulding surface of said mould, a roller shaft threaded through said mould for suspending said mould, means for rotatably supporting said roller shaft, said means including split bearing housings adapted to be opened for the removal of said roller shaft in a direction normal to the axis of said roller shaft, a drive shaft aligned with said roller shaft, means rotatably supporting said drive shaft, and disengageable coupling means between said drive shaft and said roller shaft.

References Cited in the file of this patent
UNITED STATES PATENTS

| | | |
|---|---|---|
| 402,132 | Berry | Apr. 30, 1889 |
| 1,582,586 | Dundas | Apr. 27, 1926 |
| 1,978,643 | McKettrick | Oct. 30, 1934 |
| 2,499,387 | Johnson | Mar. 7, 1950 |
| 2,560,426 | Fitzpatrick | July 10, 1951 |
| 2,630,341 | Downey | Mar. 3, 1953 |